United States Patent [19]

Noguchi et al.

[11] Patent Number: 5,051,303

[45] Date of Patent: Sep. 24, 1991

[54] MAGNETIC RECORDING MEDIUM

[75] Inventors: Hitoshi Noguchi; Shinji Saito; Hiroo Inaba; Hiroshi Ogawa, all of Kanagawa, Japan

[73] Assignee: Fuji Photo Film Co., Ltd., Kanagawa, Japan

[21] Appl. No.: 424,004

[22] Filed: Oct. 19, 1989

[30] Foreign Application Priority Data

Oct. 19, 1988 [JP] Japan ................................. 63-261576
Oct. 5, 1989 [JP] Japan .................................. 1-260998

[51] Int. Cl.$^5$ ............................................. G11B 23/00
[52] U.S. Cl. ..................................... 428/329; 428/694; 428/900
[58] Field of Search .................... 428/329, 694, 900

[56] References Cited

U.S. PATENT DOCUMENTS

| | | | |
|---|---|---|---|
| 4,410,590 | 10/1983 | Kawahara et al. | 428/900 |
| 4,624,883 | 11/1986 | Yamaguchi et al. | 428/694 |
| 4,689,263 | 8/1987 | Kambe et al. | 428/900 |
| 4,784,895 | 11/1988 | Mizuno et al. | 428/900 |
| 4,847,147 | 7/1989 | Aonuma et al. | 428/694 |
| 4,851,289 | 7/1989 | Ogawa et al. | 428/694 |

*Primary Examiner*—Paul J. Thibodeau
*Attorney, Agent, or Firm*—Sughrue, Mion, Zinn, Macpeak & Seas

[57] ABSTRACT

A magnetic recording medium is disclosed, comprising a nonmagnetic support having thereon plural magnetic layers comprising ferromagnetic particles dispersed in a binder, said ferromagnetic particles consisting of an iron oxide or a cobalt-containing iron oxide, said plural magnetic layers comprising at least an upper magnetic layer and a lower magnetic layer, wherein said upper magnetic layer has a coercive force (Hc) of from 650 to 1000 Oe, a crystallite size of the ferromagnetic particles contained in said upper magnetic layer is less than 500 Å as measured by a X-ray diffraction method, an average length in the long axis of the ferromagnetic particles contained in said upper magnetic layer is from 0.1 microns to less than 0.25 microns as measured by a transmission type electronmicroscope, said lower magnetic layer has a coercive force (Hc) of from 0.6 to 1.0 times that of said upper magnetic layer, a crystallite size of the ferromagnetic particles contained in said lower magnetic layer is larger than that of said upper magnetic layer and is in the range of 500 Å or less, and an average length in the long axis of the ferromagnetic particles contained in said lower magnetic layer is larger than that of said upper magnetic layer and is in the range of from more than 0.1 microns to less than 0.25 microns.

7 Claims, No Drawings

MAGNETIC RECORDING MEDIUM

FIELD OF THE INVENTION

The present invention relates to a magnetic recording medium comprising a nonmagnetic support and a magnetic layer, and more particularly it relates to a magnetic recording medium comprising plural magnetic layers.

BACKGROUND OF THE INVENTION

Recently with improvements in magnetic recording, there has been a growing demand for a high image quality and a high audio quality. To meet such demand, ferromagnetic particles are pulverized and magnetic flux density of the magnetic recording medium is increased. Also, an increased consumption of a magnetic recording medium may require that it is inexpensive. A magnetic recording medium comprising plural magnetic layers have been proposed to achieve the foregoing requirements, because an upper magnetic layer can provide characteristics for a high image quality, and a lower magnetic layer can provide characteristics for a high audio quality, thereby causing suitable ferromagnetic particles for each to be used. Further, the use of plural magnetic layers results in reduced costs because suitable materials can be used depending on desired characteristics of each of the plural layers. In order to attain a high image quality and a high audio quality, it is required to increase electromagnetic characteristics, particularly Rf output, to decrease noise, and to increase S/N.

To this end, it is required to increase the number of ferromagnetic particles per volume by making ferromagnetic particles small. However, even if the specific surface area of ferromagnetic particles is increased to increase the number of ferromagnetic particles per volume, it is difficult to attain the above object because holes are formed in the surface of ferromagnetic particles so that the size of ferromagnetic particles is not substantially reduced, and the ratio of the long axis to the short axis of ferromagnetic particles is reduced.

Namely, there are problems that when holes are formed in the surface of ferromagnetic particles, the loss of magnetic ratio increases, and when the long axis/short axis ratios are reduced, the orientation property of ferromagnetic particles is deteriorated at the time of the manufacture of a magnetic recording medium.

When ferromagnetic particles are made small, there is a further problem that the transfer characteristics are deteriorated due to the increase of components with a low coercive force, thus making the ferromagnetic particles impractical.

To overcome the above problems, JP-A-63-187419 (The term "JP-A" as used herein means an "unexamined published Japanese patent application") proposes plural magnetic layers in which an average length in the long axis of ferromagnetic particles contained in an uppermost magnetic layer is less than 0.25 microns, a crystallite size of the ferromagnetic particles contained in the uppermost layer is less than 300 Å as measured by X-ray diffraction, an average length in the long axis of ferromagnetic particles contained in magnetic layers other than the uppermost layer is 0.25 microns or more, and a crystallite size of the ferromagnetic particles contained in the magnetic layers other than the uppermost layer is 300 Å A or more.

The present inventors have found that when such plural magnetic layers are used in a video tape of VHS or beta type, Hc (i.e., coercive force) of an upper magnetic layer is preferably 650 to 1000 Oe, and Hc of a lower magnetic layer is preferably 0.6 to 1.0 times that of the upper magnetic layer.

However, it has been found that when ferromagnetic particles contained in a lower magnetic layer, having an average length in the long axis of 0.25 microns or more are used, noise at the short wave length region is increased, S/N is widely decreased, the surface property of the magnetic layer is deteriorated, and also Y-S as well as Y-S/N are decreased.

SUMMARY OF THE INVENTION

An object of the present invention is to provide a magnetic recording medium for a video tape in which output as well as S/N are high at both short and long wave length regions, and the magnetic reprint characteristic is excellent.

To achieve the foregoing and other objects, the present invention provides a magnetic recording medium comprising a nonmagnetic support having thereon plural magnetic layers comprising ferromagnetic particles dispersed in a binder, said ferromagnetic particles consisting of an iron oxide or a cobalt-containing iron oxide, said plural magnetic layers comprising at least an upper magnetic layer and a lower magnetic layer, wherein said upper magnetic layer has a coercive force (Hc) of from 650 to 1000 Oe, a crystallite size of the ferromagnetic particles contained in said upper magnetic layer is less than 500 Å as measured by a X-ray diffraction method, an average length in the long axis of the ferromagnetic particles contained in said upper magnetic layer is from 0.1 microns to less than 0.25 microns as measured by a transmission type electromicrosope, said lower magnetic layer has a coercive force (Hc) of from 0.6 to 1.0 times that of said upper magnetic layer, a crystallite size of the ferromagnetic particles contained in said lower magnetic layer is larger than that of said upper magnetic layer and is in the range of 500 Å or less, and an average length in the long axis of the ferromagnetic particles contained in said lower magnetic layer is larger than that of said upper magnetic layer and is in the range of more than 0.1 microns to less than 0.25 microns.

DETAILED DESCRIPTION OF THE INVENTION

In a magnetic recording medium such as a video tape of VHS or beta type, it is preferred that the coercive force (Hc) of an upper magnetic layer is 650 to 1000 Oe, preferably 700 to 950 Oe. If Hc is less than 650 Oe, output and S/N at the long wave length are deteriorated. If Hc is more than 1000 Oe, output and S/N at the short wave length region are extremely deteriorated. As mentioned above, in the present invention, Hc of the lower magnetic layer is 0.6 to 1.0 times that of the upper magnetic layer. If Hc of the lower magnetic layer is too small compared to the above range, the magnetic reprint characteristics are noticeably deteriorated.

Hc of the lower magnetic layer is 0.6 to 1.0 times, preferably 0.8 to 1.0 times that of the upper magnetic layer. If Hc of the lower magnetic layer is 1.1 times or more that of the upper magnetic layer, electromagnetic characteristics at the long wave length region are deteriorated. If Hc of the lower magnetic layer is 0.5 times or less, the magnetic reprint characteristic is undesirably reduced. Particularly preferred Hc of the lower magnetic layer is 600 to 850 Oe.

It has been found that a crystallite size and an average length in the long axis of ferromagnetic particles widely influence output and S/N at the short and long wave length regions, and the magnetic reprint characteristics.

Namely, a crystallite size of the ferromagnetic particles contained in the upper magnetic layer is less than 500 Å, preferably from 200 to 400 Å and more preferably 300 to 360 °A. If the crystallite size is 500 A or more, output as well as S/N at both long and short wave length regions is decreased. As seen from the above, if a crystallite size of the ferromagnetic particles contained in the upper magnetic layer is too large, the crystallite size influences not only output and S/N at the long wave length region but also output and S/N at the short wave length region. It is preferred that a crystallite size of the ferromagnetic particles contained in the lower magnetic layer is 500 Å or less, preferably 300 Å to 480 ° and more preferably 400 to 450 Å, and also is larger than that of the ferromagnetic particles contained in the upper magnetic layer.

If a crystallite size of the ferromagnetic particles contained in the lower magnetic layer is too small, output as well as S/N at both long and short wave length regions decrease, because dispersion properties decrease, and surface properties deteriorate.

An average length in the long axis of the ferromagnetic particles contained in the upper magnetic layer is 0.1 or more to less than 0.25 microns and preferably 0.1 to 0.2 microns. If an average length in the long axis in the upper magnetic layer is less than 0.1 microns, output and S/N at the long wave length region decrease, because orientation properties deteriorate, and Br (residual magnetic flux density) decreases. If the average length in the long axis in the upper magnetic layer is 0.25 microns or more, noise at the long wave length region increase, and S/N tends to decrease.

It is preferred that an average length in the long axis of the ferromagnetic particles contained in the lower magnetic layer is larger than that of the upper magnetic layer in the range of more than 0.1 to less than 0.25 microns and particularly 0.15 to 0.24 microns. If an average length in the long axis in the lower magnetic layer is 0.1 microns or less, the magnetic reprint characteristics deteriorate. If an average length in the long axis in the lower magnetic layer is 0.25 microns or more, output and S/N at the short wave length region are noticeably liable to deteriorate, and output and S/N at the long wave length region are also liable to deteriorate.

In the present invention, when Hc of the upper magnetic layer is made to be 650 to 1000 Oe, output as well as S/N at both long and short wave length regions is improved. When Hc of the lower magnetic layer is made to be 0.6 to 1.0 times that of the upper magnetic layer, output and S/N at the short wave length region are increased, and the magnetic reprint characteristics are also improved. When a crystallite size of the ferromagnetic particles contained in the upper magnetic layer is made to be less than 500 Å, S/N at both long and short wave length regions is improved. When a crystallite size of the ferromagnetic particles in the lower magnetic layer is made to be larger than that of the upper magnetic layer in the range of 500 Å or less, surface properties are increased and output as well as S/N at both long and short wave length regions is noticeably improved. When an average length in the long axis of the ferromagnetic particles in the upper magnetic layer is made to be 0.1 or more to less than 0.25 microns, output as well as S/N at both long and short wave length regions is extremely improved. Further, when an average length in the long axis of the ferromagnetic particles in the lower magnetic layer is made to be larger than that of the upper magnetic layer in the range of more output as well than 0.1 microns to less than 0.25 microns as S/N at the short wave length region are noticeably improved. It is quite unexpected that output as well as S/N at both long and short wave length regions, and the magnetic reprint characteristics are improved by using a combination of a specified range of components in the present invention.

In the present invention, a crystallite size of ferromagnetic particles is measured from (1,1,0) plane by X-ray diffraction, and calculated from the formula of Hall. An average length in the long axis of ferromagnetic particles is measured by transmission electron microscope.

Ferromagnetic particles which can be used in the present invention include conventional one such as an iron oxide [e.g., $\alpha$-Fe$_2$O$_3$, Fe$_3$O$_4$, and FeOx (x=1.33 to 1.50)] or a cobalt-containing iron oxide [e.g., $\alpha$-Fe$_2$O$_3$, Fe$_3$O$_4$, and FeOx (x=1.33 to 1.50)]. The cobalt-containing iron oxide includes a Co-modified iron oxide such as a Co-doped iron oxide or a Co-dissolved iron oxide, of a Co-coated iron oxide, etc. Particularly preferred is Co-$\gamma$-Fe$_2$O$_3$ which is used in both upper and lower layers.

In the general manufacture of an acicular iron oxide, alkali such NaOh etc., is added to an aqueous solution of ferrous sulfate to adjust pH to 10 or more while heated to 30° C. followed by blowing air into the reaction system. The oxidation is continued to form $\alpha$-FeOOH, and the crystallite size is varied by alteration in pH. Namely, if the pH is increased, the crystallite size of $\alpha$-FeOOH is increased. The crystallite size of the ferromagnetic particles which can be used in the present invention can be controlled by treating the above $\alpha$-FeOOH in a subsequent step. (Regarding $\gamma$-iron oxide, it can also be manufactured using conventional methods).

In the present invention, a binder used for forming a magnetic layer or a backing layer which is formed if desired, can be a thermoplastic resin, a thermosetting resin, a reactive type resin or a mixture thereof, which are conventionally known.

Thermoplastic resins which can be used as a binder include resins having a softening temperature of 150° C. or less, an average molecular weight of 10,000 to 300,000 and a degree of polymerization of about 50 to 2,000, such as, for example, a copolymer of vinyl chloride and vinyl acetate, a copolymer of vinyl chloride, a copolymer of vinyl chloride and vinylidene chloride, a copolymer of vinyl chloride and acrylonitrile, a copolymer of acrylic acid ester and acrylonitrile, a copolymer of acrylic acid ester and vinylidene chloride, a copolymer of acrylic acid ester and styrene, a copolymer of methacrylic acid ester and acrylonitrile, a copolymer of methacrylic acid ester and vinylidene chloride, a copolymer of methacrylic acid ester and styrene, a urethane elastomer, a nylon-silicon resin, nitrocellulose-polyamide resins, polyvinyl fluoride, a copolymer of vinylidene chloride and acrylonitrile, a copolymer of butadiene and acrylonitrile, a polyamide resin, a polyvinyl butyral, cellulose derivatives (e.g., cellulose acetic butyrate, cellulose diacetate, cellulose triacetate, cellulose propionate, nitrocellulose, ethylcellulose, methylcellulose, propylcellulose, methylethylcellulose, carboxymethylcellulose, acetylcellulose), a copolymer of styrene and butadiene, a polyester resin, a copolymer of chlorovinyl ether and acrylic acid ester, an amino resin, various synthetic rubber thermoplastic resins or a mixture of two or more of any of the above resins.

Thermosetting or reactive type resins which can be used as a binder include resins having a molecular weight of 200,000 or less when they are in the coating composition. When the coating composition for forming a magnetic layer is coated, dried and then heated, these resins react and the molecular weight thereof becomes infinite due to such reactions such as a condensation reaction, an adduct reaction and the like. Among these resins, resins that do not soften nor melt until they are heat-decomposed are preferred. Specifically, the resins include phenolic resins, phenoxy resins, epoxy resins, hardenable polyurethane resins, urea resins, melamine resins, alkyd resins, silicon resins, reactive acrylic resin, epoxy polyamide resins, nitrocellulose melamine resins, a mixture of high molecular weight polyester resins and isocyanate prepolymer, a mixture of a copolymer of methacrylate and a diisocyanate prepolymer, a mixture of a polyester polyol and a polyisocyanate, a urea and formaldehyde resin, a mixture of a low molecular weight glycol/a high molecular weight diol/triphenylmethane triisocyanate, polyamine resins, polyimine resins, or a mixture of two or more of any of the above resins.

One or two or more of the above resins can be used as a binder for forming a magnetic layer.

In addition to the above binder, additives can be added to the binder. Regarding the compounding ratio of the ferromagnetic particles and the binder used in the magnetic layer, generally 5 to 300 parts by weight (preferably 10 to 100 parts by weight and more preferably 20 to 40 parts by weight) of the binder can be used per 100 parts by weight of the ferromagnetic particles.

Regarding the compounding ratio of nonmagnetic particles and the binder used in the backing layer, generally 30 to 300 parts by weight (preferably 40 to 150 parts by weight) of the binder can be used per 100 parts by weight of the nonmagnetic particles.

Additives which can be added to the binder include dispersing agents, lubricating agents, abrasive agents, antistatic agents, anti-oxidizing agents, solvents or the like.

It is preferred that the thermoplastic resin, thermosetting resin, and reactive type resin further contain generally from 1 to 6 kinds of following functional groups in addition to those contained in the main chain; carboxylic acid, sulfinic acid, sulfenic acid, sulfonic acid, phosphoric acid, sulfuric acid, phosphonic acid, phosphine, boric acid, acid groups such as a sulfuric acid ester group or a phosphoric acid ester group or an alkyl ester group of these ester groups (such acid groups may be sodium salts of them), amino acids, amino sulfonic acids, sulfuric acid esters or phosphoric acid esters of aminoalcohol, amphoteric groups such as alkyl betain agents, amino groups, imino groups, imide groups, amide groups, epoxy groups, hydroxyl groups, alkoxy groups, thiol groups, halogen groups, silyl groups, and siloxane groups, in an amount of $1 \times 10^{-6}$ to $1 \times 10^{-2}$ equivalent per 1g of the resin.

Polyisocyanates which can be used in the present invention include, for example, tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate or triphenylmethane triisocyanate, the reaction products of these isocyanates and polyalcohols, and polyisocyanates having 2 to 15 monomeric units produced by condensing these isocyanates. Such polyisocyanates have an average molecular weight of preferably 100 to 20,000.

The above-described polyisocyanates are commercially available under the trade names of "Coronate L", "Coronate HL", "Coronate 2023", "Coronate 2031", "Millionate MR", and "Millionate MTL" produced by Nippon Polyurethane Co., Ltd.; "Takenate D-102", "Takenate D-110N", "Takenate D-200", "Takenate D-202", "Takenate 300S", "Takenate 500", produced by Takeda Chemical Industries, Ltd.; and "Sumidule T-80", "Sumidule 44S", "Sumidule PF", "Sumidule L", "Sumidule N", "Desmodule L", "Desmodule IL", "Desmodule N", "Desmodule HL", "Desmodule T65", "Desmodule 15", "Desmodule R", "Desmodule RF", "Desmodule SL", "Desmodule Z4273", produced by Sumitomo Bayer Co., Ltd. These polyisocyanates can be used alone or in mixture by taking advantage of the differences in their hardening reactivities.

In order to accelerate curing reactions, there can be used compounds having hydroxyl groups (e.g., butanediol, hexanediol, polyurethanes having a molecular weight of 1000 to 10,000, or water), compounds having amino groups (e.g., monomethylamine, dimethylamine, or trimethylamine) or catalysts of metal oxides in addition to the polyisocyanates. It is preferred that the compounds having such hydroxyl groups or amino groups be polyfunctional. It is preferred to use 5 to 40% (particularly 20 to 40%) by weight of the polyisocyanates based on the total weight of the binder.

Dispersing agents which can be used in the present invention include fatty acids $R_1COOH$ (in which $R_1$ is an alkyl group having 9 to 25 carbon atoms) having 10 to 26 carbon atoms such as capric acid, caproic acid, lauric acid, myristic acid, palmitic acid, stearic acid, behenic acid, oleic acid, elaidic acid, linoleic acid, linolenic acid or stearol acid; alkali metals (e.g., Li, Na, K, $NH_4^+$) or alkali earth metals (e.g., Mg, Ca, Ba) of these fatty acids; soaps of metals such as copper or lead; fatty acid amides of these fatty acids; and lecithin. Moreover, higher alcohols having 4 or more carbon atoms (e.g., butanol, octyl alcohol, myristyl alcohol, stearyl alcohol), their sulfuric acid esters, their phosphoric acid esters, and their amine compounds can be used as dispersing agents. Further, there can be used as dispersing agents polyalkyleneoxides; their sulfuric acids esters, their phosphoric acid esters, their amine compounds; and sulfosuccinic acids, sulfosuccinic acid esters, etc. In order to change the compatibility with a binder or the characteristics of it, substituent groups such as Si or F can be introduced to these compounds. These dispersing agents are usually used in one or more kinds. One kind of the dispersing agents are added in an amount of generally 0.005 to 20 parts by weight per 100 parts by weight of the binder. The dispersing agents may be previously applied on the surfaces of ferromagnetic particles and nonmagnetic particles, or may be added in the course of the dispersion process. In addition to the above dispersing agents, there can be preferably used surface active agents such as carboxylic acids or phosphoric acid esters etc., and fluorine containing surface active agents such as "Fluorad FC 95", "FC 129", "FC 430", and "FC 431".

Lubricating agents which can be used for forming a magnetic layer or a backing layer include inorganic fine particles such as molybdenum disulfide, boron nitride, fluorinated graphite, calcium carbonate, barium sulfate, silicon oxides, titanium oxides, zinc oxides, stannous oxide, or tungsten disulfide; acryl styrene resin fine particles, benzoguanamine resin fine particles, melamine resin fine particles, polyolefin resin fine particles, polyester resin fine particles, polyamide resin fine particles, polyimide resin fine particles, or polyethylene fluoride resin fine particles; silicone oils fatty acid modified silicone oils, graphite, fluorinated alcohols, polyolefins (e.g., polyethylene waxes), polyglycols (e.g., polyethylene oxide waxes), tetrafluoroethylene oxide waxes, polytetrafluoroglycols, perfluorofatty acids, perfluoro fatty acid esters, perfluoro alkyl sulfuric acid esters, perfluoro alkyl phosphoric acid esters, alkyl phosphoric acid esters, polyphenyl ethers; fatty acids esters of monobasic fatty acids having 10 to 20 carbon atoms and alcohols containing at least one kind of monovalent, divalent, trivalent, tetravalent, or hexavalent alcohols having 3 to 12 carbon atoms; fatty acid esters having total carbon atoms of 11 to 28 and monobasic fatty acids having 10 or more carbon atoms and monovalent through hexavalent alcohols. Fatty acids having 8 to 22 carbon atoms, fatty acid amides or aliphatic alcohols can also be used as organic lubricating agents.

Examples of such organic lubricating agents include butyl caprylate, octyl caprylate, ethyl laurate, butyl laurate, octyl laurate, ethyl myristate, butyl myristate, octyl myristate, ethyl palmitate, butyl palmitate, octyl palmitate, ethyl stearate, butyl stearate, octyl stearate, amyl stearate, anhydrosorbitan monostearate, anhydrosorbitan distearate, anhydrosorbitan tristearate, anhydrosorbitan tetrastearate, anhydrosorbitanethyleneoxide monostearate, oleyl oleate, oleyl alcohol, and lauryl alcohol. These organic lubricating agents can be used alone or in combination. Moreover, additives for lubricating oils may be used with the lubricating agent of the present invention. Such additives include antioxidizing agents (e.g., alkyl phenols), rust-preventing agents (e.g., naphthenic acid, alkenyl succinic acid, dilauryl phosphate), oiling agents (e.g., rape seed oil, lauryl alcohol), high-pressure lubricating agents (e.g., dibenzylsulfide, tricresyl phosphate, tributyl phosphite), detergent dispersing agents, viscosity index improvers, pour point depressants, and defoaming agents. The lubricating agents are added in an amount of generally 0.05 to 20 parts by weight, per 100 parts by weight of the binder.

The abrasive agents for forming the magnetic layer or the backing layer in the present invention include α-alumina, γ-alumina, α-γ-alumina, fused alumina, silicon carbide, chromium oxide, cerium oxide, corundum, diamond, α-iron oxide, garnet, emery (main components: corundum and magnetite), silica rock, silicon nitride, boron nitride, molybdenum carbide, boron carbide, tungsten carbide, titanium carbide, quartz, tripoli, diatomite, or dolomite, etc. Such abrasive agents have a Moh's hardness of 6 or higher, preferably 8 or higher, and can be used alone or in combination up to 4 kinds of them. The abrasive agents have an average particle diameter of generally 0.005 to 5 microns, preferably 0.01 to 2 microns. The amount of abrasive agents is generally 0.01 to 20 parts by weight and preferably 1 to 15 parts by weight, per 100 parts by weight of the binder.

Organic solvents which can be used in arbitrary proportions at steps of dispersing, mixing, coating in the present invention include ketone solvents such as acetone, methyl ethyl ketone, methyl isobutyl ketone, cyclohexanone, isophorone or tetrahydrofuran; alcohol solvents such as methanol, ethanol, propanol, butanol, isobutyl alcohol, isopropyl alcohol or methyl hexanol; ester solvents such as methyl acetate, ethyl acetate, butyl acetate, isobutyl acetate, isopropyl acetate, ethyl lactate, or glycol acetate monoethyl ether; ether solvents such as diethyl ether, tetrahydrofuran, glycol dimethyl ether, glycol monoethyl ether, or dioxane; aromatic hydrocarbon solvents such as benzene, toluene, xylene, cresol, chlorobenzene or styrene; chlorinated hydrocarbon solvents such as methylene chloride, ethylene chloride, carbon tetrachloride, chloroform, ethylene chlorohydrin or dichlorobenzene; N,N-dimethyl formamide; and hexane.

The method for mixing and kneading is not particularly limited, and the order of adding each component can optionally be determined. The mixing and kneading device to prepare a coating composition for a magnetic layer and a coating composition for a backing layer can be a conventional one, such as, for example, a two-roll mill, a three-roll mill, a ball mill, a pebble mill, a Trommel, a sand grinder, a Szegvar, an attritor, a high speed impeller, a dispersing machine, a high speed stone mill, a high speed impact mill, a Disper, a kneader, a high speed mixer, a ribbon blender, a co-kneader, an intensive mixer, a tumbler, a blender, a disperser, a homogenizer, a single axial screw extruder, a biaxial screw extruder, or an ultrasonic dispersing device. Details of techniques relating to mixing, kneading and dispersing are disclosed in T.C. Patton, *Paint Flow and Pigment Dispersion* John Wiley & Sons Company, 1964; Shinichi Tanaka, *Industrial Materials* Vol. 25, 37(1977) etc., and reference in these papers. In these papers, the above-mentioned devices are optionally combined to forward the coating composition, followed by coating. Such techniques are also disclosed methods described in the papers and reference above, mixing, kneading, and dispersing are also carried out in the present invention to prepare a coating composition for a magnetic layer and a coating composition for a backing layer.

The components constituting the coating composition are dissolved in an organic solvent to form a coating solution. The coating solution is coated on a support and then dried. When the support is used as a film, it has a thickness of generally about 2.5 to 100 microns, preferably 3 to 70 microns. When the support is used as a disk or a card, it has a thickness of generally about 0.03 to 10 mm. When the support is used as a drum, it may be a cylindrical shape.

The film can be made of plastics, such as polyester (e.g., polyethylene terephthalate, polyethylene naphthalate), polyolefins (e.g., polypropylene, polyethylene), cellulose derivatives (e.g., cellulose triacetate or cellulose diacetate), vinyl resins (e.g., polyvinyl chloride, polyvinylidene chloride), polycarbonate, polyamide resins or polysulfone, metal materials such as aluminum or copper, and ceramics such as glass. These supports may be subjected to pre-treatment such as corona-discharge treatment, plasma treatment, undercoating treatment, heating treatment, dust removal treatment, metal vapor deposition treatment or alkaline treatment.

The coating composition for forming the magnetic layer and the backing layer can be coated on a support by various coating methods such as an air doctor coating, a blade coating, an air knife coating, a squeeze coating, a dipcoating, a reverse roll coating, transfer roll coating, a gravure coating, a kiss coating, a cast coating, a spray coating, a bar coating, or a spin coating, etc. These coating methods are concretely described in *Coating Industry* by Asakura Company, pages 253 to 277, (March 20, 1971). In the present invention, a "wet-on-wet coating method" is preferably adopted, where a coating composition for forming inner magnetic layers (i.e., lower layers) and a coating composition for forming a surface magnetic layer (i.e., upper layers) are coated on a support while the compositions for their magnetic layers are wet.

The above "wet-on-wet coating method" is described in JP-A-61-139929.

A method for dispersing the ferromagnetic particles in a binder and a method for coating them on a support and disclosed in detail in JP-A-54-46011 and JP-A-54-21805.

The magnetic layers thus provided on the support preferably are subjected to magnetic orientation to orientate the ferromagnetic particles while they are being dried, and then the magnetic layers are dried. The support is transferred generally at a rate of 10 to 1000 m/minute and is dried at a temperature of 20 to 130° C.

If desired, it is subjected to a surface smoothing treatment as described in U.S. Pat. No. 3,473,960 and then slit to a desired shape. It is preferred that a filler is continuously subjected to steps of surface treating, mixing, dispersing, coating, heat-treating, calendering, irradiating, surface polishing, and cutting. These steps may be separated into some groups. In these steps, temperature and humidity can be controlled. Namely, the temperature is generally 10 to 130° C., and the humidity is generally 5 to 20 mg/m$^3$ as measured by water content in air.

These steps are disclosed in, for example, JP-B-40-23625 (The term "JP-B" as used herein means an "examined Japanese patent publication"), JP-B-39-28368, and U.S. Pat. No. 3,473,960. Also, JP-B-13181 shows basic and important techniques in this field.

The present invention will be illustrated in more detail by the following Example. In Example, all parts are by weight.

EXAMPLE

| | |
|---|---|
| Co—FeOx (x = 1.45, Regarding Hc, Crystallite size, and Average length in the long axis, see Table 1) | 100 parts |
| Copolymer of vinyl chloride and vinyl acetate (Amount of sulfonic acid group: 0.25 wt. %, Degree of polymerization: 400) | 15 parts |
| Polyester polyurethane (Amount of sulfonic acid group: 0.1 wt. %) | 5 parts |
| Polyisocyanate ("Coronate L") | 6.7 parts |
| Electroconductive carbon (Particle diameter: 10 microns) | 1 part |
| Oleic acid | 2 parts |

| -continued | |
|---|---|
| Butyl acetate | 20 parts |
| Methyl ethyl ketone (MEK) | 80 parts |

The coating solution having the above composition was coated on a polyethylene terephthalate (PET) film having a thickness of 14 microns to form a single magnetic layer or plural magnetic layers. The single layer was 4 microns thick. The plural layers comprised an upper layer having a thickness of 0.5 microns and a lower layer having a thickness of 3.5 microns.

The thus obtained samples were evaluated in the following manner and the results are shown in Table 1.

Y-S (Electromagnetic characteristics at the long wave length region):

Video signals of 50% white were recorded by a standard recording image current. The average envelope of the reproduced output was measured using an oscilloscope and calculated from the following formula (1).

$$\text{Sensibility of reproduced output (dB)} = 20\log_{10} V/V_o \quad (1)$$

(V: an average value, $V_o$: the average value of comparative example 12-1).

C-S (Electromagnetic characteristics at the short wave length region):

Video signals of one color were recorded by a standard recording image current, and calculated according to the same method as above.

Y-S/N:

The video S/N (signal/noise) was measured using a noise meter ("925R" produced by Shibasoku Co., Ltd.). The results are shown in Table 1 in relative values as compared to a tape of "comparative example 12-1" which was used as a standard tape. The noise levels of the tapes were measured with a video tape recorder "NV-8200" produced by Matsushita Electric Industrial Co., Ltd., and the noise meter as described above using a low-pass filter (4.2 MHz) and a high-pass filter (10 KHz).

C-S/N:

The same procedure as in Y-S/N was repeated, except that a low-pass filter (500 KHz AM) was used.

With an input level which is higher than a standard input level by 10 dB, sine wave signals at 1 KHz were recorded with no signal, 1 KHz, no signal (The reel rotates about 10 times), 1 KHz (The reel rotates once or less), and no signal, in that order.

This recording was repeated several times, followed by leaving 48 hours at a temperature of 30±0.5° C. The reproduced output level was measured and calculated by the following formula. Also, the maximum magnetic reprint signal level of no signal part passed through a band-pass filter at 1 kHz was measured and calculated from the following formula.

$$\text{Magnetic reprint (dB)} = A - B$$

[A: a reproduced output level (dBs) at 1 KHz, B: a maximum magnetic reprint signal level (dBs)]

TABLE 1

| | Upper Magnetic Layer Ferromagnetic Particles | | | Lower Magnetic Layer Ferromagnetic Particles | | | | | | | |
|---|---|---|---|---|---|---|---|---|---|---|---|
| | Hc (θe) | Crystallite size (Å) | Length in the long axis (μ) | Hc (θe) | Crystallite size (Å) | Length in the long axis (μ) | Y-S (dB) | Y-S/N (dB) | C-S (dB) | C-S/N (dB) | S/P (dB) |
| Comparative Example 1 | 630 | 360 | 0.2 | 650 | 450 | 0.24 | +2.5 | +2.8 | +3.2 | +3.5 | 53 |
| Example 1-2 | 650 | " | " | " | " | " | +3.0 | +3.5 | +3.2 | +3.5 | 54 |
| Example 1-1 | 700 | " | " | " | " | " | +3.2 | +3.7 | +3.1 | +3.4 | 53 |
| Example 1-3 | 850 | " | " | " | " | " | +3.4 | +3.8 | +3.0 | +3.3 | 54 |
| Example 1-4 | 1000 | " | " | " | " | " | +3.5 | +3.9 | +2.9 | +3.2 | 55 |
| Comparative Example 2 | 1020 | " | " | " | " | " | +3.5 | +3.9 | +2.5 | +2.8 | 55 |
| Comparative Example 3 | 700 | " | " | 400 | " | " | +3.2 | +3.6 | +3.3 | +3.6 | 47 |
| Example 2-2 | " | " | " | 420 | " | " | +3.3 | +3.7 | +3.2 | +3.5 | 51 |
| Example 2-3 | " | " | " | 500 | " | " | +3.2 | +3.6 | +3.1 | +3.4 | 52 |
| Example 2-1 | " | " | " | 650 | " | " | +3.2 | +3.7 | +3.1 | +3.4 | 53 |
| Example 2-4 | " | " | " | 700 | " | " | +3.3 | +3.8 | +2.9 | +3.2 | 54 |
| Comparative Example 4 | 700 | 360 | 0.2 | 720 | 450 | 0.24 | +3.2 | +3.7 | +2.5 | +2.7 | 55 |
| Example 3-2 | " | 200 | " | 650 | " | " | +3.5 | +3.9 | +3.3 | +3.6 | 53 |
| Example 3-3 | " | 300 | " | " | " | " | +3.3 | +3.8 | +3.2 | +3.5 | 53 |
| Example 3-1 | " | 360 | " | " | " | " | +3.2 | +3.7 | +3.1 | +3.4 | 53 |
| Example 3-4 | " | 440 | " | " | " | " | +3.0 | +3.5 | +3.0 | +3.3 | 54 |
| Comparative Example 5 | " | 520 | " | " | " | " | +2.9 | +2.9 | +2.8 | +3.0 | 54 |
| Comparative Example 6 | " | 360 | " | " | 300 | " | +2.8 | +3.3 | +2.8 | +2.9 | 51 |
| Example 4-1 | " | " | " | " | 400 | " | +3.2 | +3.7 | +3.1 | +3.4 | 53 |
| Example 4-2 | " | " | " | " | 450 | " | +3.1 | +3.6 | +3.0 | +3.3 | 53 |
| Example 4-3 | " | " | " | " | 500 | " | +3.0 | +3.5 | +2.7 | +2.9 | 54 |
| Comparative Example 7 | 700 | 360 | 0.2 | 650 | 550 | 0.24 | +2.8 | +3.3 | +2.5 | +2.6 | 55 |
| Comparative Example 8 | " | " | 0.08 | " | 450 | " | +2.6 | +3.0 | +3.0 | +3.1 | 53 |
| Example 5-2 | " | " | 0.1 | " | " | " | +3.0 | +3.5 | +3.0 | +3.3 | 54 |
| Example 5-1 | " | " | 0.2 | " | " | " | +3.2 | +3.7 | +3.1 | +3.4 | 53 |
| Example 5-3 | " | " | 0.22 | " | " | " | +3.0 | +3.5 | +3.0 | +3.3 | 53 |
| Comparative Example 9 | " | " | 0.28 | " | " | " | +2.9 | +3.0 | +2.8 | +3.0 | 53 |
| Comparative Example 10 | " | " | 0.2 | " | " | 0.15 | +3.0 | +3.3 | +3.0 | +3.3 | 49 |
| Example 6-2 | " | " | " | " | " | 0.22 | +3.3 | +3.8 | +3.2 | +3.6 | 53 |
| Example 6-1 | " | " | " | " | " | 0.24 | +3.2 | +3.7 | +3.1 | +3.4 | 53 |
| Comparative Example 11 | " | " | " | " | " | 0.28 | +3.0 | +3.3 | +3.0 | +2.8 | 55 |
| Single layer | | | | | | | | | | | |
| Comparative Example 12-1 | 700 | 360 | 0.2 | — | — | — | 0 | 0 | 0 | 0 | 53 |
| Comparative Example 12-2 | 650 | 450 | 0.25 | — | — | — | −1.0 | −2.0 | −1.0 | −2.5 | 57 |

As is apparent from results of Table 1, the sensitivity and output at the long wave length region are mainly influenced by the ferromagnetic-particles of the upper magnetic layer. The sensitivity and output are liable to be deteriorated when Hc is too small, and a crystallite size as well as an average length in the long axis of the ferromagnetic particles are too large. This effect is particularly large when Hc of the upper magnetic layer is too large. This is a quite unexpected fact.

The sensitivity and output at the short wave length region are mainly influenced by ferromagnetic particles of the lower magnetic layer, and they are noticeably deteriorated when Hc is too large and a crystallite size as well as an average length in the long axis of the ferromagnetic particles are too large. Contrary to the above, sensitivity and output are noticeably improved in the range defined by the present invention. Moreover, the sensitivity and output at the short wave length region are liable to be deteriorated when Hc, a crystallite size and an average length in the long axis of the ferromagnetic particles in the upper magnetic layer are too large. Contrary to the above, they are improved in the range defined by the present invention. This is also a quite unexpected fact.

Regarding magnetic reprint effects, it has been known that they are deteriorated when ferromagnetic particles are made small. Magnetic reprint effects are also deteriorated when a crystallite size and an average length in the long axis of the ferromagnetic particles in both upper and lower magnetic layers are made too small. However, it is quite unexpected that magnetic reprint effects are greatly influenced when Hc of the lower magnetic layer is too small. This shows prominent effects attained by the present invention.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having thereon plural magnetic layers comprising ferromagnetic particles dispersed in a binder, said ferromagnetic particles consisting of an iron oxide or a cobalt-containing iron oxide, said plural magnetic layers comprising at least an upper magnetic layer and a lower magnetic layer, wherein said upper magnetic layer has a coercive force (Hc) of from 650 to 1000 Oe, a crystallite size of the ferromagnetic particles contained in said upper magnetic layer is less than 500 Å as measured by a X-ray diffraction method, an average length in the long axis of the ferromagnetic particles contained in said upper magnetic layer is from 0.1 microns to less than 0.25 microns as measured by a transmission type electron microscope, said lower magnetic layer has a coercive force (Hc) of from 0.6 to 1.0 times that of said upper magnetic layer, a crystallite size of the ferromagnetic particles contained in said lower magnetic layer is larger than that of said upper magnetic layer and is in the range of 500 Å or less, and an average length in the long axis of the ferromagnetic particles contained in said lower magnetic layer is larger than that of said upper magnetic layer and is in the range of from more than 0.1 microns to less than 0.25 microns.

2. The magnetic recording medium as in claim 1, wherein the coercive force (Hc) of said lower magnetic layer is from 0.8 to 1.0 times that of the upper magnetic layer.

3. The magnetic recording medium as in claim 1, wherein the crystallite size of the ferromagnetic particles contained in the upper magnetic layer is from 200 Å to 400 Å.

4. The magnetic recording medium as in claim 1, wherein the crystallite size of the ferromagnetic particles contained in the lower magnetic layer is from 300 Å to 480 Å.

5. The magnetic recording medium as in claim 1, wherein the ferromagnetic particles comprise an iron oxide selected from the group consisting of $\alpha$-$Fe_2O_3$, $Fe_3O_4$, and $FeOx$ (x=1.33 to 1.50).

6. The magnetic recording medium as in claim 1, wherein the iron oxide of the cobalt-containing iron oxide comprises Co-$\alpha$-$Fe_2O_3$, Co-$Fe_3O_4$, and Co-$FeOx$ (x=1.33 to 1.50).

7. The magnetic recording medium as in claim 1, wherein the ferromagnetic particles comprise Co-$\gamma$-$Fe_2O_3$.

* * * * *